April 20, 1948.     H. T. KRAFT     2,439,896
TIRE REPAIR VULCANIZING APPARATUS
Filed Sept. 5, 1946     3 Sheets-Sheet 1

INVENTOR.
Herman T. Kraft
BY
Evans + McCoy
ATTORNEYS

April 20, 1948.  H. T. KRAFT  2,439,896
TIRE REPAIR VULCANIZING APPARATUS
Filed Sept. 5, 1946  3 Sheets-Sheet 2

INVENTOR.
Herman T. Kraft
BY
Evans & McCoy
ATTORNEYS

April 20, 1948.  H. T. KRAFT  2,439,896
TIRE REPAIR VULCANIZING APPARATUS
Filed Sept. 5, 1946  3 Sheets-Sheet 3

INVENTOR.
Herman T. Kraft
BY
Evans + McCoy
ATTORNEYS

Patented Apr. 20, 1948

2,439,896

UNITED STATES PATENT OFFICE 2,439,896

TIRE REPAIR VULCANIZING APPARATUS

Herman T. Kraft, Akron, Ohio, assignor to The General Tire and Rubber Company, Akron, Ohio, a corporation of Ohio Application September 5, 1946, Serial No. 694,850

13 Claims. (Cl. 18—18)

This invention relates to a tire repair vulcanizing apparatus and more particularly to apparatus for repairing tires of the larger sizes.

The present invention has for an object to provide a vulcanizing apparatus in which the tire may be assembled with and removed from a repair vulcanizing mold with a minimum of labor.

A further object of the invention is to provide a simple and convenient device for transferring a tire to and from a suitable support upon which the tire and mold are supported during vulcanization.

With the above and other objects in view, the invention may be said to comprise the tire repair vulcanizing apparatus illustrated in the accompanying drawings hereafter described and particularly set forth in the appended claims, together with such variations and modifications thereof as will be apparent to one skilled in the art to which the invention pertains.

Reference should be had to the accompanying drawings forming part of this specification in which.

Figure 1:
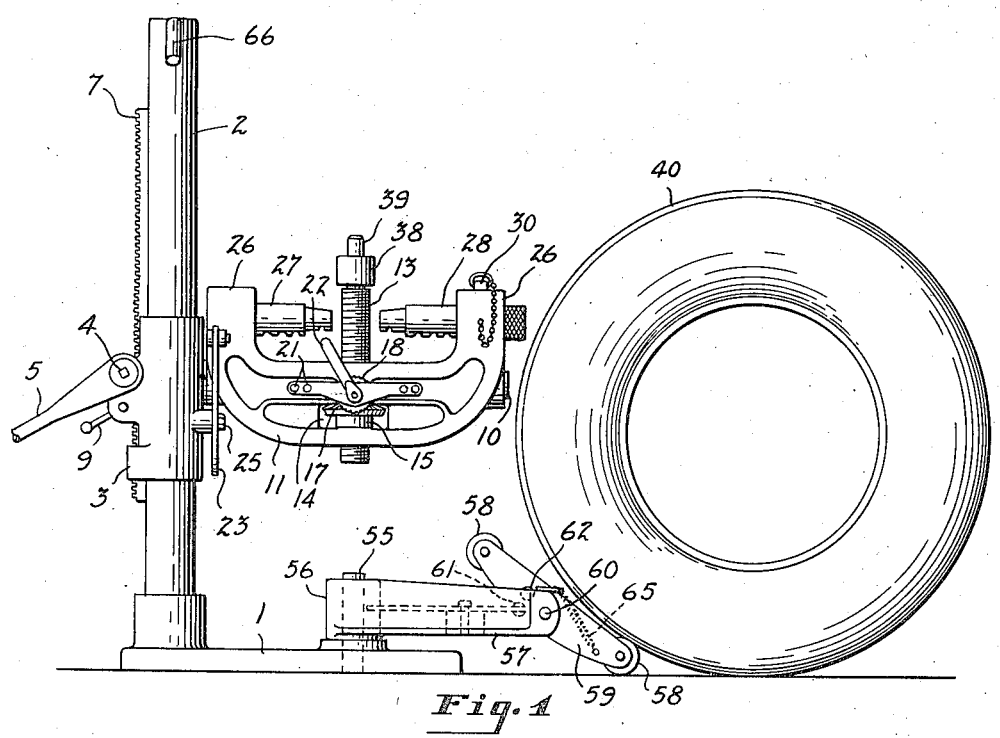
Figure 1 is a side elevation of a tire repair vulcanizing apparatus embodying the invention, the transfer table being shown in position to receive a tire casing.

Referring to the accompanying drawings, the apparatus of the present invention is provided with a suitable base 1 which carries a standard 2 upon which is mounted a vertically adjustable sleeve 3. The sleeve 3 carries a transverse shaft 4 which has a hand crank 5 attached thereto and which carries a pinion 6 which meshes with a vertical rack 7 fixed to the standard 2. By operating the crank 5 manually, the sleeve 3 may be moved up or down on the standard 2. A suitable pawl 8 is provided on the sleeve for engagement with the rack 7 to retain the sleeve 3 in any desired position of vertical adjustment, the pawl being held in locking position with respect to the rack by any suitable means such as a weighted arm 9. The sleeve 3 carries a horizontal arm in the form of a shaft 10 which provides a pivotal support for a suitable mold and tire carrying frame 11. The frame 11 has laterally projecting knuckles 12 which receive the shaft 10 to provide a pivot about which the frame has vertical swinging movement.

Centrally thereof the frame 11 carries a jack screw 13 which is guided for endwise vertical movement in the frame 11. The frame 11 is provided adjacent the bottom thereof with a slot 14 which is wide enough to receive a nut 15 in which the screw 13 is threaded. The nut 15, together with a washer 16, fits within the slot 14 and the portions of the frame 11 above and below the slot 14 are provided with openings through which the screw extends. The nut 15 has an integral bevel gear 17 which is adapted to be driven by a bevel pinion 18 carried by a shaft 19 journaled in the frame 11 and in a bracket 20 attached to the frame by means of bolts 21. The shaft 19 has a hand crank 22 attached thereto by means of which it may be turned to adjust the screw 13.

The frame 11 is held in adjusted positions on the shaft 10 by means of a curved link 23 which is pivoted at its upper end to the frame 11 and which has a longitudinal slot 24 which receives a bolt 25 attached to the sleeve 3 laterally of the shaft 10. When the bolt 25 is engaged with the upper end of the slot 24, the frame 11 is supported in a position in which the screw 13 is vertical and when the bolt 25 engages the lower end of the slot 24, the frame 11 is supported with the screw 13 in an inclined position. The frame 11 is so constructed that its center of gravity is shifted across the shaft 10 in its movement from its upright to its inclined position so that the weight of the frame will act to hold the frame 11 in either of the two positions referred to.

The frame 11 has upright end portions 26 on opposite sides of the screw 13 and the end portions 26 carry horizontal pins 27 and 28 which are axially alined and radially disposed with respect to the screw 13, the pins 27 and 28 projecting from the inner and outer upright portions 26 toward the screw 13. The pins 27 and 28 are held in position by means of a screw 29 and a locking pin 30. The pin 28 has spaced sockets 30a to receive the locking pin 30 and can be adjusted axially in its upright 26.

The screw 13 provides a support for a suitable tire mold that is adapted to be assembled with the tire casing in such manner that both the mold and casing may be supported upon the frame 11. At its upper end the screw 13 carries a cap 31 that is provided with a reduced tip 32 that engages in a socket 33 in the thickened base 34 of an inner mold member or core 35. The core member 35 is preferably a hollow metal member shaped to conform to the interior of the portion of a tire casing that is being repaired. The screw 13 has a reduced tip 36 which is of a diameter to fit within a socket 37 formed in the cap 31. In order to accommodate tire casings of different diameters, one or more intermediate members 38 may be interposed between the upper end of the screw 13 and the cap 31. The intermediate section 38 is formed to fit upon the tip 36 of the screw and has a projection 39 at its upper end which is of the same diameter as the tip 36 so that it will fit within the socket 37 of the cap 31. The core 35 is assembled within a tire casing 40 and when placed upon the upper end of the screw 13 serves to support the tire casing.

In order to hold all portions of the tire casing tightly against the core 35, the tire casing is engaged externally by an inflatable bag 41 which is shaped to substantially conform to the exterior of the portion of the tire casing that is engaged with the core 35. To hold the bag 41 in place a flexible cover 42 is provided which fits over the inflatable bag and which is provided with sector shaped ends terminating in loops 43 which receive arcuate bars 44 carried by attaching plates 45 provided with openings 46 which receive the pins 27 and 28. The cover 42 may be drawn tightly against the bag 41 by adjusting the screw 13 vertically to exert upward pressure on the core 35 and through the tire casing and inflatable bag to the cover 42 to draw the cover tightly against the exterior of the bag. The attaching plates 45 are provided with flanges 47 in the openings thereof which engage with notches 48 on the underside of the pins 27 and 28 to anchor the inner ends of the flexible cover 42 so that the inflatable bag 41 may be held tightly against the exterior of the tire casing from bead to bead.

Figure 4:
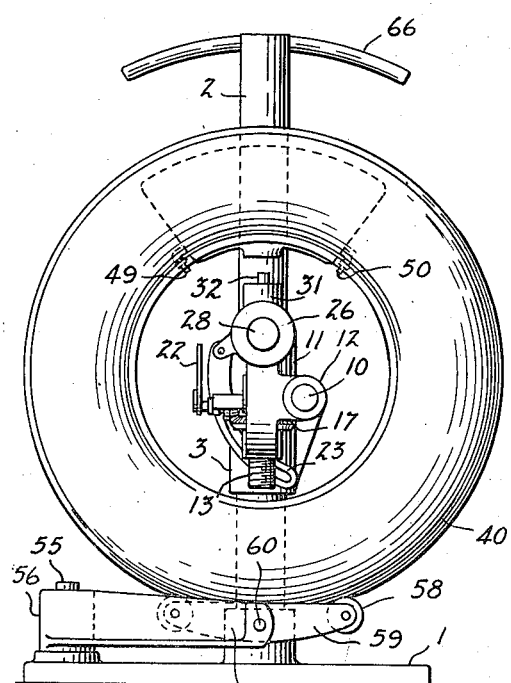
Fig. 4 is a front elevation of the apparatus with the tire casing in position for transfer to the support.
Figure 5:
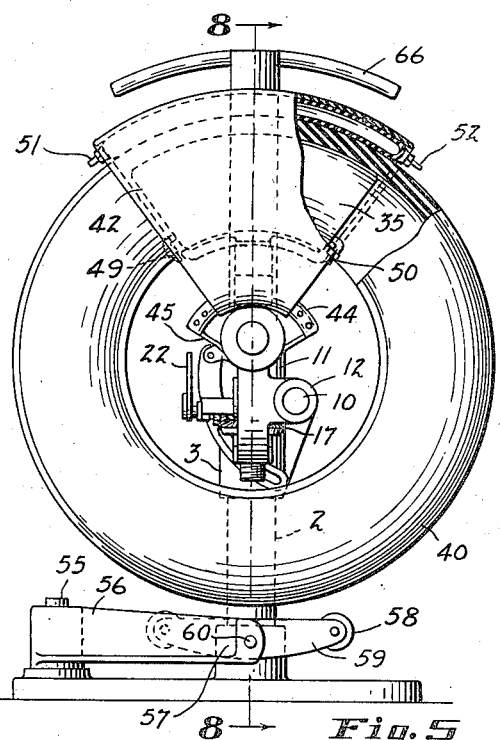
Fig. 5 is a front elevation of apparatus showing a tire casing lifted off the transfer table.
Figure 6:
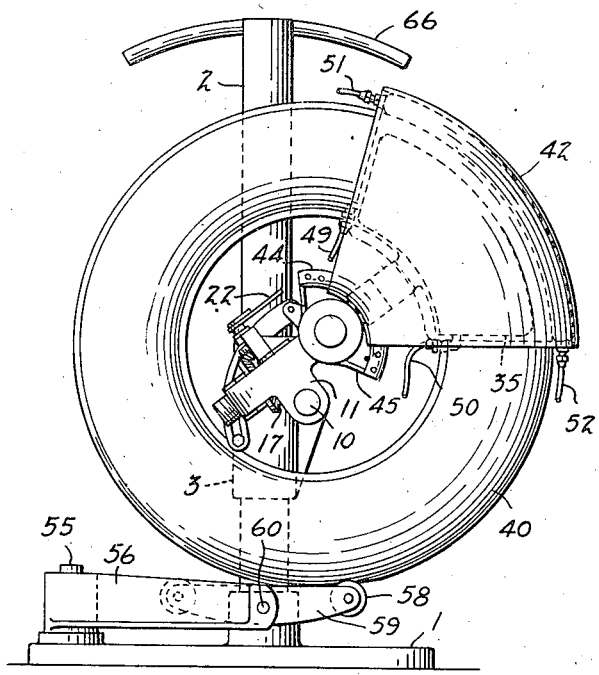
Fig. 6 is a front elevation of the apparatus showing the tire and mold in vulcanizing position.
Figure 7:
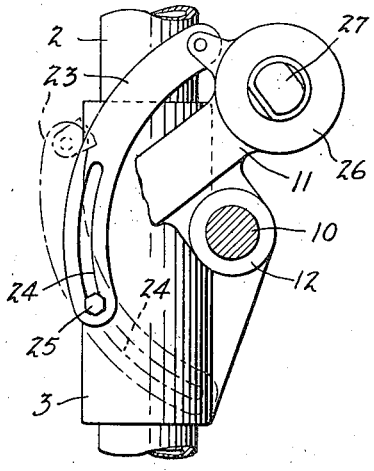
Fig. 7 is a transverse section through the tire support showing the support adjusting device.
Figures 8, 9:
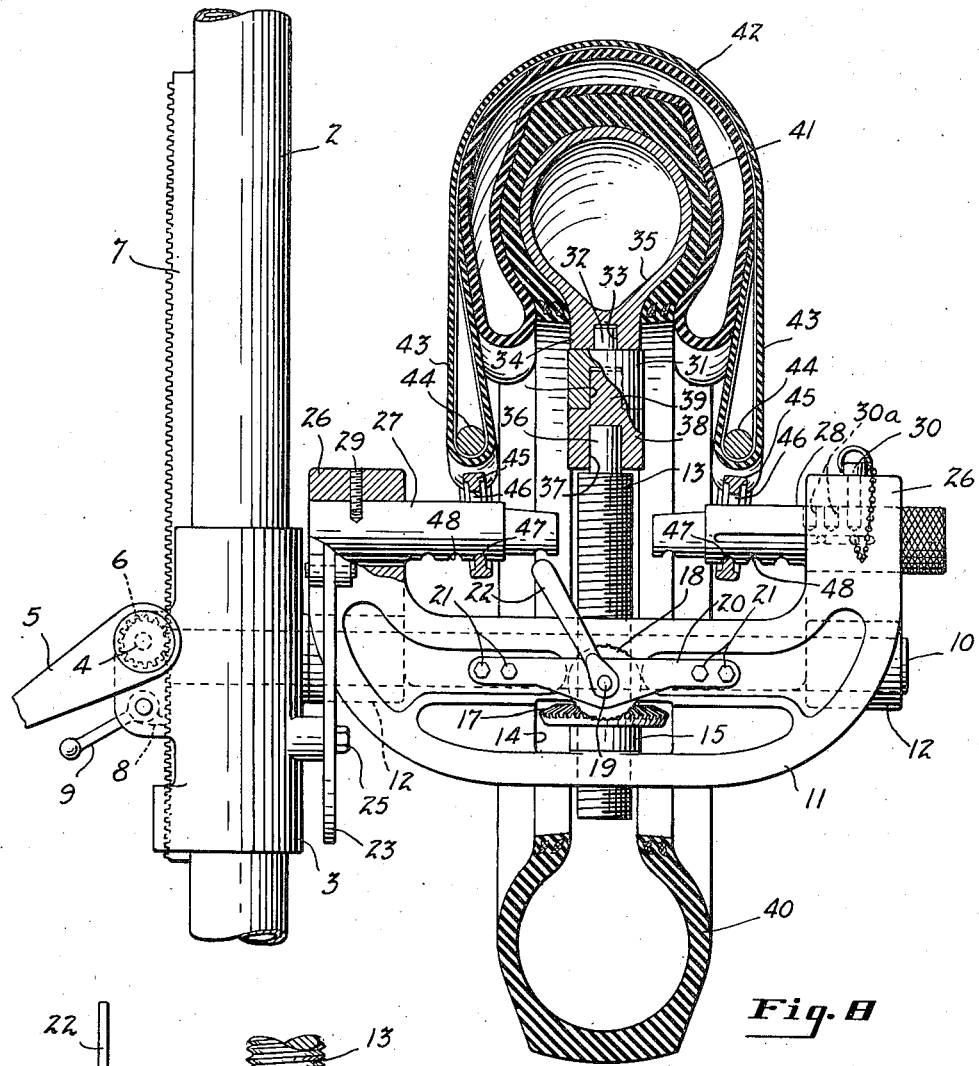
Fig. 8 is a vertical section through the mold, tire casing and support, the section being on an enlarged scale and taken substantially on the line indicated at 8—8 in Fig. 5.
Fig. 9 is a sectional view showing the jack actuating gearing.

During the vulcanizing operation steam is passed through the core 35 and inflatable bag 41, the core 35 being provided with inlet and exhaust tubes 49 and 50 and the bag 41 being provided with inlet and exhaust tubes 51 and 52. The tire casing 40 is assembled with the mold members and mounted on the support 11 with the support in its upright position as shown in Figs. 4 and 5. For vulcanizing this support is tilted to the position shown in Fig. 6 so that the drain tubes 50 and 52 are positioned in the lowermost portions of the core and bag, and the inlet tubes 49 and 51 are connected to the upper ends of the core and bag so that proper drainage of condensate is provided during the vulcanizing operation.

Figures 2, 3:
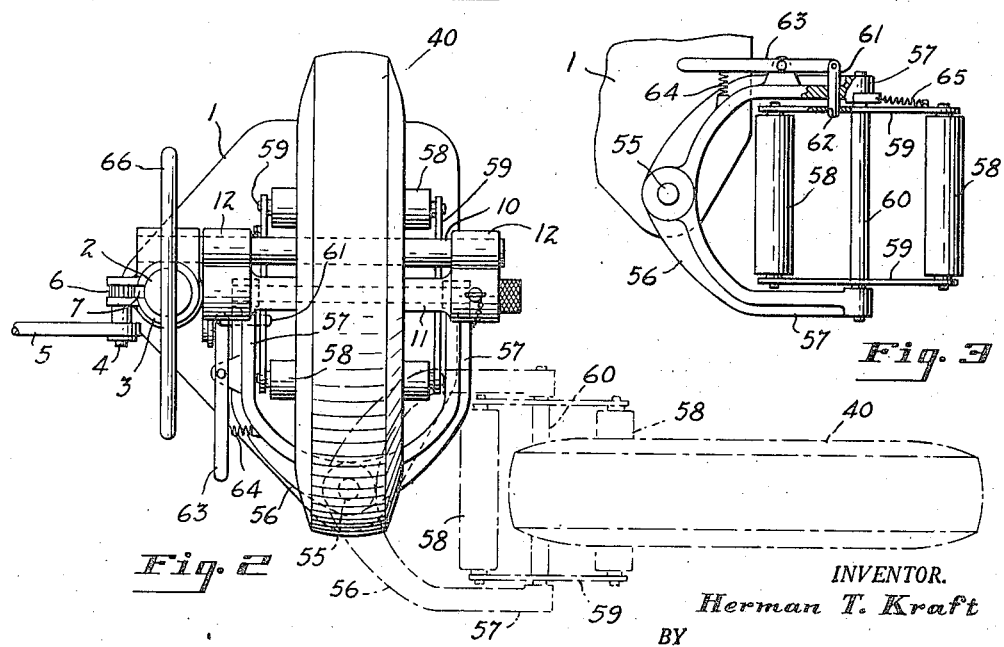
Fig. 2 is a top plan view of the apparatus showing the transfer table and tire casing in full lines positioned to place the tire casing upon the support, the tire receiving position of the transfer table being shown in dotted lines.
Fig. 3 is a plan view of the tire transfer table.

The apparatus of the present invention is particularly designed for tires of the larger sizes which are too large and too heavy for convenient handling. As shown in Figs. 1, 2 and 3 the base 1 carries a vertical pin 55 laterally of the standard 2 which provides a pivot for a horizontally swinging transfer table which is employed to facilitate the mounting of the tire casing upon the supporting frame 11. The transfer table has a U frame 56 which is mounted on the pivot 55 to swing horizontally, the frame 56 having parallel outwardly projecting arms 57 which provide a support for a tire receiving platform composed of a pair of spaced rollers 58 mounted in side bars 59 which are connected intermediate the rollers by means of a cross shaft 60 which is journaled in the outer ends of the arms 57 to provide a horizontal pivot for the tire supporting platform. The rollers 58 are spaced apart a sufficient distance to support a tire casing 40 in upright position when the roller carrying frame is horizontally disposed.

The roller frame is adapted to be held in horizontal position by means of a suitable latch 61 slidable in one of the arms 57 and engaging in a hole 62 in one of the bars 59. As shown in Fig. 3 a lever 63 is pivoted to the outer end of the latch 61 and the lever 63 is engaged by a spring 64 which actuates the lever in a direction to press the pin 61 toward locking position. When the latch 61 is released the roller carrying frame is free to move to a position in which the outermost roller 58 engages the floor as shown in Fig. 1 of the drawings. The platform may also be provided with a spring 65 which assists in moving the roller frame to a horizontal position when the tire is rolled onto the rollers 58. The outer face of the bar 59 engaged by the latch pin 61 is of a width such that the pin 61 engages its outer surface while the frame is tilted and will snap into the opening 62 when the frame is swung back to horizontal position. The transfer table is so mounted that the tire receiving platform is movable from a position beneath the support 11 to a position at one side of the support where a tire casing 40 may be rolled onto the table, the rollers 58 being parallel with the shaft 10 and on opposite sides thereof when the transfer table is beneath the support and at right angles to the shaft 10 when the table is in tire receiving position.

The upper end of the standard carries a cross bar 66 which provides a support for the flexible cover 42 while the tire casing is being mounted on the supporting member, the height of the standard 22 being such that the cover 42 may be hung over the cross bar 66 with one of its ends anchored to the inner retaining pin 27 and its opposite end hanging upon the opposite side of the standard.

The necessary patches are applied to the interior of the tire casing to be repaired and a core 35 is positioned within the portion of the tire which is to be repaired. The roller platform is then tilted to floor engaging position as shown in Fig. 1 and the tire casing with the core 35 therein is then rolled onto the rollers 58. The engagement of the tire tread with the interior of the rollers 58 causes the roller platform to be tilted to its horizontal position where it is retained by the latch 61. In this position of the rollers 58 the tire casing is supported in an upright position. The frame 56 may then be swung horizontally to the position shown in full lines of Fig. 2 causing the supporting frame 11 to enter the central opening of the tire casing. The tire casing 40 supported on the rollers 58 can then be readily turned to bring the core 35 to a position directly over the upper end of the jack screw 13. The jack screw then is engaged with the core 35 whereupon any repair operations may be conveniently performed upon the exterior of the tire casing and vulcanizing material may be applied externally to the damaged portion of the casing. After the vulcanizing material has been applied the bag 41 inflated with air is placed over the top portion of the tire casing which rests upon the core 35 and the cover 42 is swung over the bag 41 and engaged with the outer of the anchoring pins 28. The engagement of the outer anchoring plate 45 of the cover with the pin 28 may be effected by removing the locking pin 30 and retracting the pin 28 to permit the plate 45 to be positioned opposite the inner end of the pin and the pin to be moved into the opening 46 of the plate 45 to anchor the outer end of the tire cover. After the tire cover is thus anchored the screw 13 is actuated to tighten the cover and to lift the tire casing 40 out of engagement with the rollers 58 so that the supporting frame 11 and the mold and tire casing may be swung to inclined position shown in Fig. 6 for the vulcanizing operation.

Upon completion of the vulcanizing operation the frame 11 is swung back to the upright position and the jack screw 13 is operated to lower the tire casing into engagement with the rollers 58 and to loosen the cover 42. The pin 28 may be then retracted and the cover may be then swung back over the top of the standard 2 which will permit removal of the inflatable bag. The screw 13 may be moved downwardly enough to free the core 35 so that the transfer table with the tire thereon may be swung laterally to a position clear of the support where the tire may be rolled off onto the floor.

It will be apparent that the device of the present invention provides a means for repairing large tires with a minimum of labor.

The apparatus of the present invention is designed to handle tires which vary considerably in size, the adjustment of the support 11 vertically on the standard 2 enabling the support to be positioned at the proper height for tires of different diameters and the cover securing means being designed to accommodate covers of different sizes. It is to be understood that suitable cores 35 will be provided for each size of tire to be repaired and that different sizes of bags 41 and covers 42 may be provided. The bags 41 and covers 42 are adaptable to tires varying in size so that it will not be necessary to provide as many bags and covers as cores 35. Since the core 35 should accurately fit within the tire casing being repaired it is desirable to provide a core for each diameter of tire.

It is to be understood that variations and modifications of the specific devices herein shown and described for purposes of illustration may be made without departing from the spirit of the invention.

What I claim is:

1. Repair vulcanizing apparatus comprising a stand having horizontally projecting supporting means adapted to enter the center opening of a tire casing, a transfer table mounted for movement into and out of a position beneath said supporting means, and means on said table for positioning a tire in upright position thereon so that said supporting means may be caused to enter the opening of the tire casing when the said table is moved to a position beneath said supporting means.

2. Repair vulcanizing apparatus comprising a support having a standard provided with a horizontally projecting tire supporting arm adapted to enter the center opening of a tire casing and a transfer table mounted adjacent said standard for movement from a position beneath said arm to a position where a tire casing may be rolled onto it, said table having means for positioning a tire casing in an upright position thereon, whereby said arm will enter the opening of said tire casing when said table is moved to a position beneath said arm.

3. Repair vulcanizing apparatus comprising a support having a standard provided with a horizontally projecting tire supporting arm adapted to enter the center opening of a tire casing, said arm being adjustable vertically on said standard to accommodate tires of different sizes, and a transfer table upon which a tire casing may be rolled, said table having means for supporting a tire casing in upright position and being movable from a tire receiving position clear of said arm to a transfer position beneath said arm to position the tire casing with the said arm in its central opening.

4. Repair vulcanizing apparatus comprising a support having a standard provided with a horizontal tire supporting arm, a transfer table mounted adjacent the base of said standard for movement from a tire receiving position clear of said arm to a position beneath said arm, said table having means for holding a tire casing in a position to receive said arm in its central opening when said table is moved to a position beneath said arm, means carried by the arm for lifting a tire casing off said table, mold sections engageable with a portion of a tire casing, and means for detachably securing said mold sections to said arm.

5. Repair vulcanizing apparatus comprising a support having a standard provided with a horizontal tire supporting arm, a transfer table mounted adjacent the base of said standard for movement from a tire receiving position clear of said arm to a position beneath said arm, said table having means for holding a tire casing in a position to receive said arm in its central opening when said table is moved to a position beneath said arm, a mold member engageable with the interior of a tire casing, a mold member engageable with the exterior of a tire casing, and means for detachably connecting said mold members to said arm.

6. Repair vulcanizing apparatus comprising a support having a standard provided with a horizontal tire supporting arm, a transfer table mounted adjacent the base of said standard for movement from a tire receiving position clear of said arm to a position beneath said arm, a pair of spaced tire tread engaging rollers on said table for rotatably supporting a tire casing in upright position whereby said arm is caused to enter the central opening of the casing when the table is moved to a position beneath said arm, mold sections engageable with the interior and exterior of the tire casing, and means for detachably securing said sections to said supporting arm.

7. Repair vulcanizing apparatus comprising a support having a standard and a horizontal tire supporting arm projecting from the standard, a tire transfer table adjacent the base of the standard and mounted to swing about a vertical axis, said table having a pair of spaced parallel tire supporting rollers and being movable from a tire receiving position in which said rollers are disposed to one side of said arm to a transfer position in which said rollers are substantially parallel with said arm below the same and upon opposite sides thereof.

8. Repair vulcanizing apparatus comprising a support having a standard and a horizontal tire supporting arm projecting from the standard, a tire transfer table adjacent the base of the standard and mounted to swing about a vertical axis, said table being movable from a tire receiving position to a tire transfer position beneath said arm, said table having a tire receiving platform pivoted intermediate its ends to swing about a horizontal axis and movable to a floor engaging position, and a latch for releasably securing said platform in horizontal position.

9. Repair vulcanizing apparatus comprising a support having a standard and a tire supporting arm projecting horizontally from the standard, a transfer table mounted adjacent the base of the standard and having a tire carrying platform comprising a pair of spaced rollers for rotatably supporting a tire in upright position, said table being movable from a tire receiving position to a transfer position in which said platform is beneath said arm and said arm projects into the center opening of the tire casing on the platform, and a jack carried by said arm for lifting a tire off said table.

10. Repair vulcanizing apparatus comprising a support having a standard and a tire supporting arm projecting horizontally from the standard, a transfer table mounted adjacent the base of the standard and having a tire carrying platform comprising a pair of spaced rollers for rotatably supporting a tire in upright position, said table being movable from a tire receiving position to a transfer position in which said platform is beneath said arm and said arm projects into the center opening of the tire casing on the platform, interior and exterior mold members adapted to engage a tire casing, a member mounted on said arm to swing vertically on said arm, means for securing said mold members to a tire casing and to said member, and means for securing said swinging member in adjusted angular positions.

11. Repair vulcanizing apparatus comprising a support having a standard and a tire supporting arm projecting horizontally from the standard, a transfer table mounted adjacent the base of the standard and having a tire carrying platform comprising a pair of spaced rollers for rotatably supporting a tire in upright position, said table being movable from a tire receiving position to a transfer position in which said platform is beneath said arm and said arm projects into the center opening of the tire casing on the platform, means for securing said mold members to a tire casing and to said member including a jack operable to lift said tire off said table to permit retraction of the table so that said member may swing laterally on said arm to position the mold members in an inclined position for vulcanizing.

12. Repair vulcanizing apparatus comprising a stand having a horizontal arm, a supporting member pivoted on said arm to swing vertically, said member having a central horizontal portion and upwardly extending inner and outer end portions, a vertically adjustable jack carried by the central portion of said member for engagement with a tire core, inwardly projecting bars carried by said end portions, a flexible mold cover having end portions anchored to said bars, and means for securing said supporting member in adjusted angular positions.

13. Repair vulcanizing apparatus comprising a stand having a horizontal arm, a supporting member pivoted on said arm to swing vertically, said member having a central horizontal portion and upwardly extending inner and outer end portions, a vertically adjustable jack carried by the central portion of said member for engagement with a tire core, inwardly projecting bars carried by said end portions, one of said bars being slidably mounted in the outer end portion of the supporting member, a flexible mold cover having end apertures that receive said bars, and means for releasably securing said slidable bar in adjusted position to secure said cover to said supporting member.

HERMAN T. KRAFT.

REFERENCES CITED

The following references are of record in the file of this patent:

UNITED STATES PATENTS

| Number | Name | Date |
| --- | --- | --- |
| 2,280,430 | Glynn | Apr. 21, 1942 |
| 2,309,590 | Honderich | Jan. 26, 1943 |